US007334112B2

(12) United States Patent
Zahir et al.

(10) Patent No.: US 7,334,112 B2
(45) Date of Patent: Feb. 19, 2008

(54) METHOD AND APPARATUS FOR MANAGING ACCESS TO OUT-OF-FRAME REGISTERS

(75) Inventors: Achmed Rumi Zahir, Menlo Park, CA (US); Cary A. Coutant, Saratoga, CA (US); Carol L. Thompson, San Jose, CA (US); Jonathan K. Ross, Woodinville, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 531 days.

(21) Appl. No.: 10/702,355

(22) Filed: Nov. 6, 2003

(65) Prior Publication Data
US 2004/0093486 A1 May 13, 2004

Related U.S. Application Data

(62) Division of application No. 09/473,820, filed on Dec. 28, 1999, now Pat. No. 6,665,793.

(51) Int. Cl.
*G06F 9/312* (2006.01)
(52) U.S. Cl. .................................................. 712/220
(58) Field of Classification Search ................ 712/220; 711/153
See application file for complete search history.

(56) References Cited

U.S. PATENT DOCUMENTS

| 5,233,691 | A |   | 8/1993 | Ando et al. |
| 5,448,707 | A |   | 9/1995 | Hinton et al. |
| 5,522,051 | A | * | 5/1996 | Sharangpani ............... 712/202 |
| 5,721,868 | A |   | 2/1998 | Yung et al. |
| 5,870,597 | A |   | 2/1999 | Panwar et al. |
| 6,009,509 | A | * | 12/1999 | Leung et al. ............... 712/202 |
| 6,065,114 | A | * | 5/2000 | Zahir et al. ................. 712/228 |
| 6,243,668 | B1 | * | 6/2001 | Le et al. ........................ 703/27 |
| 6,314,513 | B1 | * | 11/2001 | Ross et al. .................. 712/228 |
| 6,363,474 | B1 |   | 3/2002 | McCulley et al. |
| 6,487,630 | B2 | * | 11/2002 | Bui ............................. 711/109 |
| 6,591,359 | B1 | * | 7/2003 | Hass et al. .................. 712/217 |
| 6,594,754 | B1 | * | 7/2003 | Jourdan et al. ............. 712/217 |
| 6,950,923 | B2 | * | 9/2005 | O'Connor et al. .......... 712/202 |

FOREIGN PATENT DOCUMENTS

JP          03088029          4/1991

* cited by examiner

*Primary Examiner*—Eric Coleman

(57) ABSTRACT

Method and apparatus for managing access to registers that are outside a current register stack frame are disclosed. An instruction execution unit in a processor receives an instruction to be executed. A processor includes a register stack, the register stack including a plurality of register stack frames. Each of the register stack frames includes zero or more registers. One of the plurality of register stack frames is a current register stack frame. When execution of the instruction requires writing to a register referenced by the instruction, the instruction execution unit determines whether the register referenced by the instruction is within the current register stack frame. If the instruction execution unit determines that the register is not within the current register stack frame, the instruction execution unit does not execute the instruction and may, for example, generate a fault. The instruction execution unit executes the instruction is the instruction execution unit determines that the register is within the current register stack frame. When execution of the instruction requires reading from a register referenced by the instruction, the instruction execution unit executes the instruction whether or not the register referenced by the instruction is within the current register stack frame.

22 Claims, 7 Drawing Sheets

METHOD AND APPARATUS FOR MANAGING ACCESS TO OUT-OF-FRAME REGISTERS

RELATED APPLICATIONS

This patent application is a divisional of patent application 09/473,820, filed on Dec. 28, 1999, now U.S. Pat. No. 6,665,793 which is herein incorporated by reference.

This application is related to the following commonly owned application, which discloses subject matter related to the disclosure of the present application, and which is hereby incorporated by reference in its entirety:

U.S. Utility patent application Ser. No. 09/199,003, entitled "Method and Apparatus for Transferring Data Between a Register Stack and a Memory Resource," filed on Nov. 23, 1998, and naming Jonathan K. Ross, Cary A. Coutant, Carol L. Thompson, and Achmed R. Zahir.

FIELD OF THE INVENTION

The present invention relates generally to reading from and writing to registers of a processor. Specifically, the present invention is directed to methods and apparatus for managing access to registers that are outside the current stack frame of an application executing on a processor.

DESCRIPTION OF THE RELATED ART

A register stack may comprise a number of general registers of a microprocessor, which have been designated for the storage of data required by, and pertaining to, procedures of a stored program being executed by the microprocessor. Specifically, upon execution of a particular procedure, a stack frame associated with the procedure is created within the register stack to store saved registers (containing variables local to a relevant procedure). When a procedure (referred to as the "calling" procedure) calls a further procedure (referred to as the "called" procedure), the called procedure in turn creates a further stack frame on top of the stack frame for the calling procedure. Accordingly, for a program in which a number of nested procedures are being executed, the register stack may include a corresponding number of stack frames. The stack frame corresponding to the procedure that is currently executing on the processor is referred to as the "current stack frame." A register stack accordingly allows multiple procedures to effectively share a large register file by stacking associated stack frames in both on-chip registers and off-chip memory.

Typical programs exhibit high call/return frequencies with small amplitudes. In other words, typical programs include many procedure calls to procedures that execute for a relatively short amount of time. The overhead associated with the context switches necessitated by procedure calls is relatively high for such programs. A register stack significantly reduces the number of stores (i.e. register saves) at procedures calls and loads (i.e. register restores) at procedure returns that are required for context switching, and thus provides a "cache" of information pertinent to nested procedures. As processor operating frequencies continue to increase faster than access times to memory resources (e.g. RAM) decrease, reducing the number of memory accesses performed by a program, as a result of procedure calls and returns, provides a performance advantage. This advantage is becoming increasingly significant in view of the popularity of modular and object-oriented programming, and the use of dynamically linked libraries, which typically result in programs having high call/return frequencies.

As a register stack has a limited size, it will be appreciated that in a deeply nested procedure call sequence, the capacity of the register stack to store additional registers may be exceeded and require what is termed a "spill." A spill involves storing the values of some of the registers of previous stack frames in a backing store in order to create capacity within the register stack to store registers in a new stack frame. Similarly, as the register stack empties on procedure returns, it is desirable to restore ("fill") registers of previous stack frames that have been stored in the backing store to the register stack. Spilling and filling of registers may be handled by a register stack engine. An example of a register stack engine is disclosed in the commonly owned U.S. patent application Ser. No. 09/199,003, entitled "Method and Apparatus for Transferring Data Between a Register Stack and a Memory Resource," referenced above.

Because the register stack engine may perform spilling and filling operations concurrently with programs executing on the processor, it is necessary to ensure that program operations involving access to registers do not interfere with the spilling and filling operations performed by the register stack engine. In particular, it is necessary to ensure that registers used by programs executing on the processor are not overwritten by the register stack engine and vice versa.

SUMMARY

Methods and apparatus are provided for managing access to registers that are outside a current stack frame. In particular, methods and apparatus are provided for preventing a program executing on a processor from writing to registers that are outside the current stack frame. If a program attempts to write to a register that is not in the current stack frame, a fault (such as an illegal operation fault) is generated. Attempts by the program to read from a register that is not in the current stack frame are allowed, although the data returned by such a read attempt has an undefined value.

In a further aspect, a method is provided in a processor including a register stack, the register stack including a plurality of register stack frames, each of the register stack frames including zero or more registers, one of the plurality of register stack frames comprising a current register stack frame. The method includes steps of: (A) identifying a register to be spilled to a backing store; (B) determining whether the identified register is in the current register stack frame; and (C) spilling the register to the backing store only if the identified register is determined not to be in the current register stack frame. The processor may further include an identifier of a next register in the register stack to spill to the backing store, and the step (B) may include steps of: (B)(1) determining that the identified register is in the current register stack frame when the next register in the register stack to spill to the backing store is in the current stack frame; and (B)(2) determining that the identified register is not in the current register stack frame when the next register in the register stack to spill to the backing store is not in the current stack frame.

In a further aspect, a method is provided in a processor including a register stack, the register stack including a plurality of register stack frames, each of the register stack frames including zero or more registers, one of the plurality of register stack frames including zero or more registers, one of the plurality of register stack frames comprising a current register stack frame. The method includes steps of: (A) identifying a register to be filled from a backing store; (B)

determining whether the identified register is in the current register stack frame; and (C) filling the register from the backing store only if the identified register is determined not to be in the current register stack frame.

In other aspects, apparatus and processors are provided for performing the functions described above. Other aspects of the invention include the various combinations of one or more of the foregoing aspects of the invention, as well as the combinations of one or more of the various embodiments thereof as found in the following detailed description or as may be derived therefrom. The foregoing aspects of the invention also have corresponding computer-implemented processes which are also aspects of the present invention. Other embodiments of the present invention may be derived by those of ordinary skill in the art both from the following detailed description of a particular embodiment of the invention and from the description and particular embodiment of a system in accordance with the invention.

DETAILED DESCRIPTION

Figure 1:
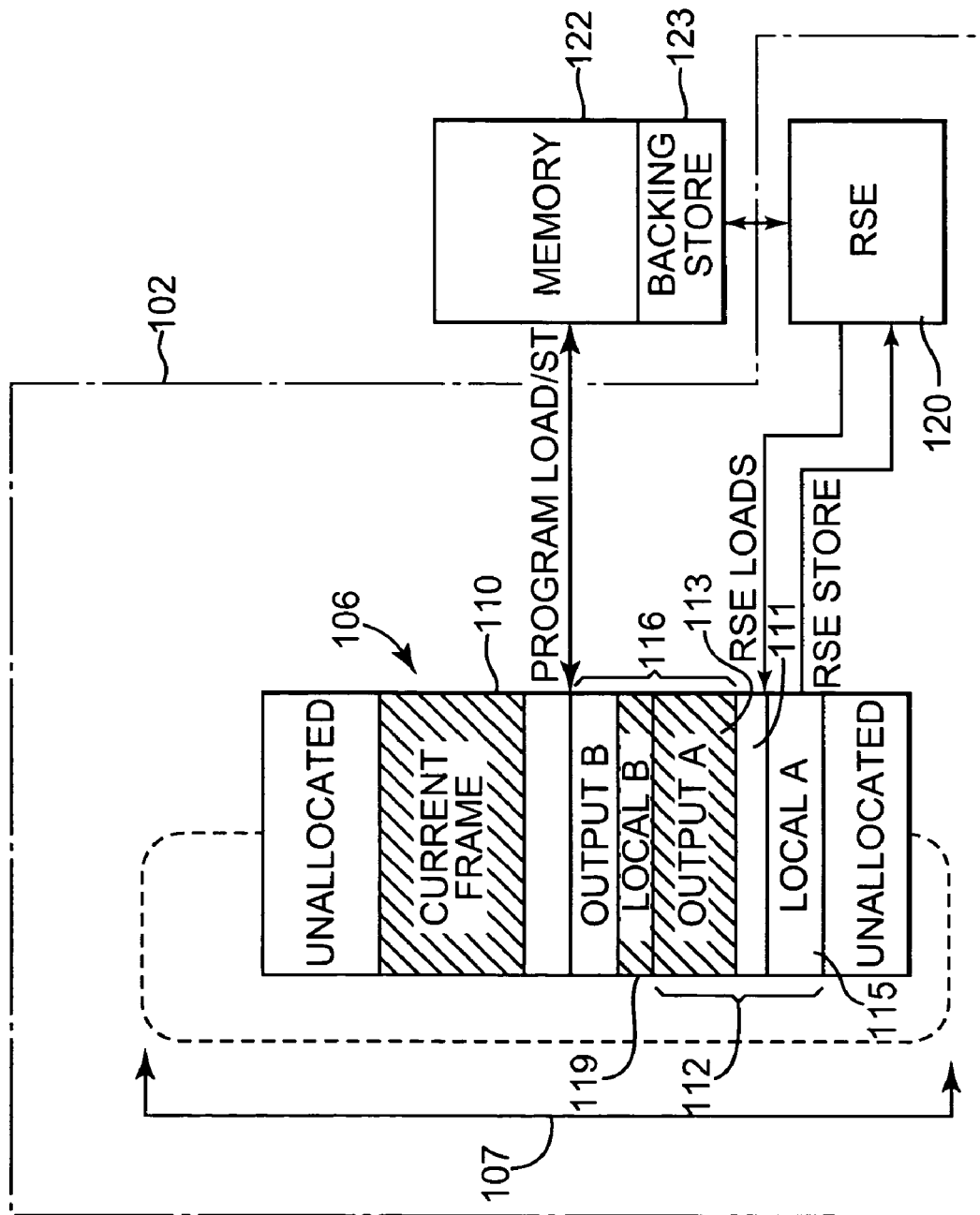
FIG. 1 is a block diagram of a microprocessor that incorporates a register stack architecture.

In one aspect of the present invention, methods and apparatus are provided for preventing a program executing on a processor from writing to registers that are outside a current stack frame. If the program attempts to write to a register that is not in the current stack frame, a fault (such as an illegal operation fault) is generated. An attempt by the program to read from a register that is not in the current stack frame is allowed, although the data returned by such a read attempt has an undefined value.

One advantage of the present invention is that it prevents a procedure executing on a processor from overwriting registers that are in stack frames associated with other procedures. An attempt to write to such out-of-frame registers indicates a programming error that should be identified and fixed. Generating a fault immediately upon an attempt by a program to write to an out-of-frame register therefore provides an easy and efficient way to detect erroneous software operation. If such a fault is not generated upon an attempt to write to an out-of-frame register, a called procedure would be able to overwrite a calling procedure's registers. Such an error would only be detected (if at all) much later during program execution (possibly millions of instructions later), making it nearly impossible to detect the source of the erroneous register overwrite. In contrast, generation of a fault immediately upon an attempted execution of an out-of-frame write enables immediate detection of the program error.

Further advantages of the present invention result from allowing programs to read from out-of-frame registers without resulting in generation of a fault. One such advantage is that existing software that computes values that do not influence the outcome of a program will continue to execute correctly. For example, an existing program may read a value from an out-of-frame register but not use the value read from the register to perform any subsequent computations. Allowing the program to perform such a read from an out-of-frame register will, therefore, allow the program to continue to execute properly even though the value that is read from the out-of-frame register is undefined.

Another advantage of allowing programs to read from out-of-frame registers without causing generation of a fault relates to application of speculative execution techniques for enhancing program execution performance. Speculative execution refers to execution of certain program instructions, such as reading from registers, before such program instructions are required by a program, in order to take advantage of processor idle time. More specifically, speculative execution typically involves execution of one or more instructions prior to a control point (such as a branch instruction), even though the instructions occur after the control point in the program code. Execution of instructions subsequent to the control point may or may not require the results of the speculatively executed instructions, depending on the outcome of the control point instructions (e.g., the outcome of the branch instruction) Speculative execution of such instructions may result in reading from a register that is not in the current stack frame. If execution of the branch instruction results in execution of a segment of code that does not include the speculatively executed instructions, any results generated by the speculatively executed instructions are not used and generation of a fault would prevent the realization of the performance enhancements provided by speculative execution techniques. By allowing out-of-frame reads to occur without resulting in generation of a fault, the present invention allows programs to take advantage of performance enhancements provided by speculative execution techniques.

Having described some general features of aspects of the present invention, various embodiments of the present invention will now be described. FIG. 1 is a block diagram of a microprocessor 102 (shown in dotted lines) that incorporates a register stack architecture. Microprocessor 102 includes a register stack 106 and a register stack engine (RSE) 120 coupled thereto. The architecture shown in FIG. 1 is described in more detail in the commonly owned U.S. patent application Ser. No. 09/199,003, entitled "Method and Apparatus for Transferring Data Between a Register Stack and a Memory Resource," referenced above. Register stack 106 may be used, by way of example, for storing in stacked registers included therein parameters and other values belonging to different procedures that are executed by microprocessor 102. In the description presented herein the term "store" in connection with the register stack 106 refers to electrically preserving a digital signal that represents a binary value. Register stack 106 is coupled to a digital memory 122 (e.g., a RAM) that includes a storage area (backing store 123). Backing store 123 may store therein the contents of specific registers in the register stack 106 when certain events occur, such as when register stack 106 does not have sufficient space (registers) left for storing data in connection with certain procedures upon occurrence of a procedure call.

As previously described, a register stack architecture allows multiple procedures to efficiently share a large register file (i.e., the registers in the register stack 106), by stacking procedure call frames, such as procedure frame 112, in registers. The speed of the processor 102 is typically significantly faster than access time to the memory 122, and use of the register stack 106 helps to reduce the number of memory accesses that may need to be performed by the processor 102 when executing a program that includes a number of procedures.

Register stack 106 includes a variable of number of general registers that are available to all programs for computation at all privilege levels. In one embodiment of the present invention described herein, the register stack 106 includes a minimum of 96 65-bit general registers, each of which is assigned a unique 7-bit register identifier (register ID). Each general register typically includes a number of bits for data storage and another number of bits to encode attributes of the data.

The set of general registers may be partitioned into two subsets: a first subset (referred to as the "static subset") (not shown) that is software visible (available) to all procedures of a program executing on the processor 102 and that includes a number of general registers; and a second subset 107 (referred to as the "stacked subset") that includes registers denominated stacked general registers (shown in the register stack 106 in FIG. 1). Not all of the registers in the stacked subset 107 are visible (i.e., accessible) to all procedures at all times. Rather, stacked subset 107 includes one or more groups of consecutive stacked registers that may be made available to a procedure by executing an ALLOCATE instruction, resulting in allocation of a register frame, such as the register frame 112, to the procedure. An ALLOCATE instruction (hereinafter referred to as "ALLOC") specifies the number of registers the called procedure expects to use. The register frame 112 may, therefore, include any number of registers. The register frame 112 includes zero or more registers 111 (typically a plurality of consecutive registers) that store data in connection with a respective procedure associated with the register frame 112. Data stored in the zero or more registers 111 may include the parameters of the respective procedure for example, but is not limited thereto. The zero or more registers 111 include a programmable number of local registers 115 and output registers 113 that make up one frame. Output registers 113 of register frame 112 include registers that may be shared with called procedures while local registers 115 include registers that may not be shared with called procedures.

Register stack 106 further includes a current frame 110. A current frame is defined as a set of architected registers, visible to software, i.e., that may be read from and written to by programs executing on the processor 102. According to one aspect of the present invention, however, programs executing on the processor 102 may not write to registers that are outside the current frame 110. The current frame 110 is configured to move "up" (toward the top part of the register stack 106 as shown in FIG. 1) if a call is made to a procedure. The current frame 110 is configured to move "down" (toward the bottom part of the register stack 106 as shown in FIG. 1) if a called procedure returns to the calling procedure. According to one aspect of the present invention, an attempt by a procedure executing on the processor 102 to read from a stacked register outside the current frame 110 returns an undefined result. According to a further aspect of the present invention, an attempt by a procedure executing on the processor 102 to write to a stacked register outside the current frame 110 causes a fault, such as an illegal operation.

Each register frame of a procedure, such as the register frame 112, has associated therewith a frame marker (not shown) that stores the state of the respective register frame. The frame markers include information relating to the sizes of the local and output portions of the corresponding stack frames. For example, a frame marker may include information related to the size of the corresponding frame (sof) which provides a measure of the number of registers included in the register frame. A frame marker may also include information related to the size of local registers (sol) which provides a measure of the number of local registers of the register frame.

The frame marker of the current frame 110 is referred to as the current frame marker (CFM) and is stored in a dedicated processor register. The CFM is not directly accessible to software and, in application programs, is updated by the register stack engine 120 through the execution of calls, returns, ALLOCs, etc. The CFM includes a number of fields for storing values related to the current frame, such as a size-of-frame field (sof) storing the size of the current frame 110 and a size-of-locals field (sol) storing the size of the local area of the current frame 110. Upon a call from a procedure, the register stack engine 120 saves the contents of the CFM by copying it to a previous frame marker (PFM) field in a previous function state (PFS) register (not shown). The PFS register includes therein multiple fields, such as the PFM field that includes values which are copied automatically from CFM on a call from a calling procedure.

Upon an ALLOC instruction, a new current frame is allocated "above" (i.e., using higher-numbered registers than those in the old current frame 110) the old current frame 110, thereby capturing a number of registers of the register stack 106 to be used by the called procedure. However, if the register stack 106 does not include sufficient registers available for the called procedure (a condition referred to as stack overflow), microprocessor 102 is stalled until the register stack engine 120 saves to memory 122 a number of registers of the register stack 106 that is sufficient to provide the current procedure with the required number of registers. As described in more detail in the commonly owned U.S. patent application Ser. No. 09/199,003, entitled "Method and Apparatus for Transferring Data Between a Register Stack and a Memory Resource," referenced above, the register stack engine 120 may be a specialized hardware circuit that may use excess memory bandwidth in the memory 122 to dynamically store (spill) the contents of registers from outside the current frame 110 of the register stack 106 to the backing store portion 123 of memory 122 concurrent with the processor's execution of instructions (referred to as program execution). The register stack engine 120 is also configured to restore (fill) the contents of registers from the backing store 123 to the register stack 106 concurrent with program execution. Upon return from a called procedure, some of the calling procedure's registers may have been saved by the register stack engine 120 to backing store 123 but not yet restored (a condition referred to as stack underflow). In this case, a return instruction causes stalling of the microprocessor 102 until the register stack engine 120 restores an appropriate number of the calling procedure's registers.

The stacked subset is automatically saved and restored by the register stack engine 120 without explicit software intervention. The register stack engine 120 utilizes register frame information (such as information stored in the frame markers) to save and restore registers from the register stack 106 to the backing store 123 at the best opportunity independent of instruction execution in the calling procedure and the called procedure.

As described above, the number of registers to be allocated to a register frame (such as the register frame 112) is specified by an ALLOC instruction. As a result, register frames for different procedures may include different numbers of registers. As described above, each procedure refers to registers in the procedure's stack frame using a register ID which may, for example, be a 7-bit register ID. Using such a register ID, a procedure can reference up to 128 registers. The register stack frame associated with a procedure may, however, have fewer than 128 registers. It is therefore possible for a procedure to attempt to access (e.g., read from or write to) a register that is outside the procedure's register stack frame by referencing a register having a register ID that is greater than the number of registers in the procedure's register stack frame. As described above, such out-of-frame accesses can result in errors, such as overwriting a register that is controlled by the register stack engine 120 rather than the procedure.

Figure 2:
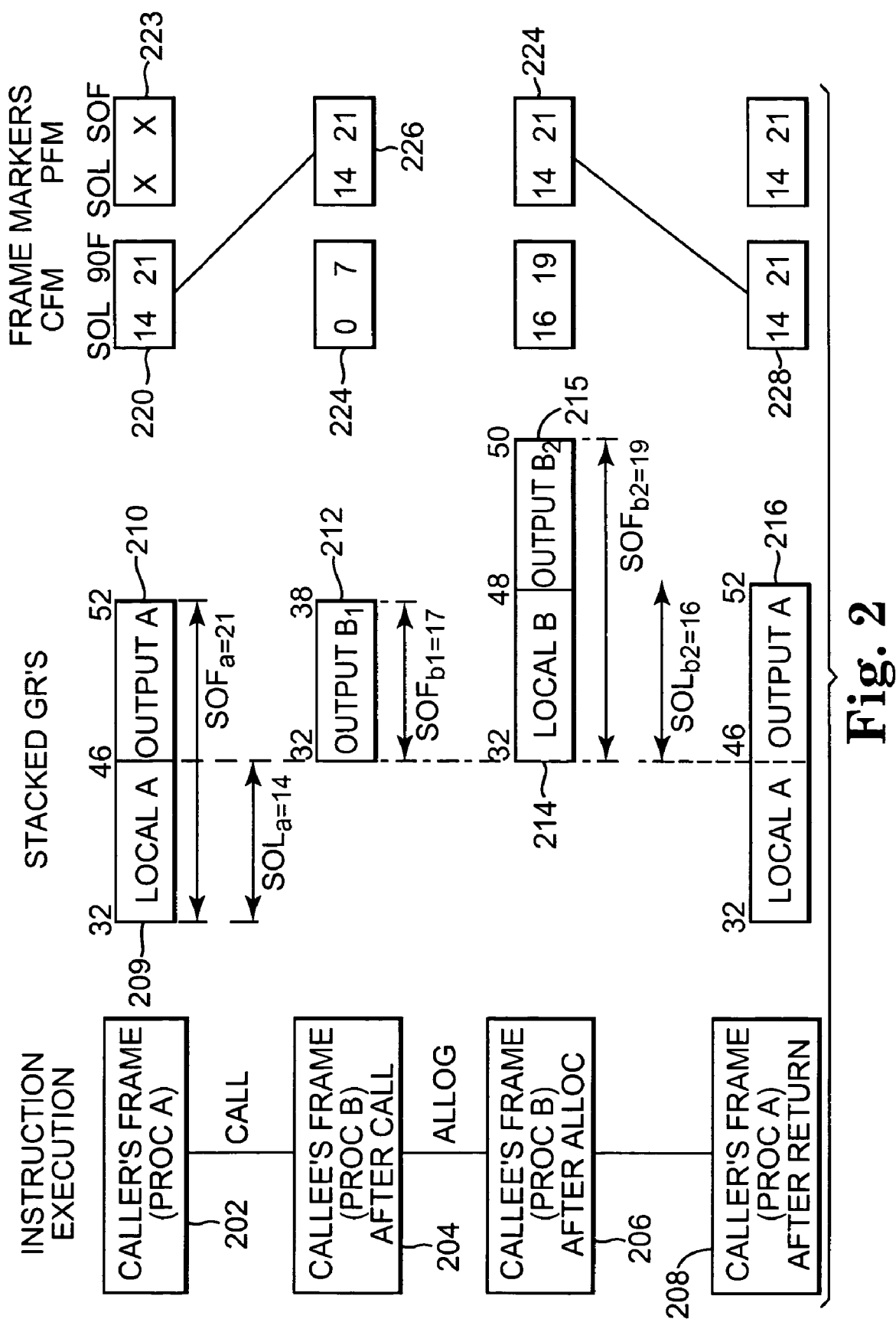
FIG. 2 is a block diagram of states of a register stack for a procedure call from a first procedure to a second procedure.

FIG. 2 illustrates in block diagram form the state of the register stack 106 for a procedure call from procedure A (caller) to procedure B (callee). The state of the register stack 106 is shown at four points: prior to the call (state 202), immediately after the call (state 204), after procedure B has executed an ALLOCATE instruction (state 206), and after procedure B returns to procedure A (state 208). As a consequence of a procedure call, a Current Frame Marker (CFM) 220 is copied (in this example) to a previous frame marker (PFM) field 226, of a Previous Function State (PFS) register, to be later restored on return from procedure B to procedure A. At state 202, procedure A's frame is defined, in this example, by general registers 32-52 and includes 21 registers, (a size of frame (sofA) of procedure A is 21). According to this arrangement, registers 32-52 are visible to procedure A. The CFM 220 for procedure A includes the pair (14, 21) where "14" denotes a size of locals (sol) of procedure A's frame and "21" denotes the size of frame (sofA) for procedure A. The PFM information 223 of this state is undefined.

After a call by procedure A to procedure B, the register stack 106 passes to state 204. As a consequence of the call, the CFM information 220 is copied to PFM field 226. After the contents of CFM 220 have been copied to PFM 226, a new value is written to CFM 224 creating a new current frame, in this example, with no locals (0 registers) and with a set of output registers (7 registers) which are caller A's output registers. The stacked registers are renamed such that, a first register in caller A's output area (general register GR46) becomes GR32 for the output area of the callee B's register frame. In this way, the output area of the caller A is made visible to the callee B that knows that its register starts from GR32. The size of callee B's local area is set to 0 in CFM 224. In this example, the size of callee B's frame (sofB) 212 is set to the size of the caller's output area 210, which is equal to (sofA-solA). In this way, caller A's output area overlaps with callee B's output area, thereby making caller A's output area visible to callee B. This overlap permits parameter and return value passing between procedures A and B.

At state 206 the local and output areas are resized using an ALLOC instruction. The CFM 220 may not be directly accessible to software and, in application programs, is updated by the register stack engine 120 through the execution of calls, returns, ALLOC, etc. The majority of application programs need only issue ALLOC instructions and save/restore the PFM field to effectively use the register stack 106. ALLOC specifies values that determine size of frame (sof) and size of locals (sol) to ensure availability of registers in the current frame of the callee. Procedure B's frame is thus dynamically resized for local area 214 and output area 215 by issuing the ALLOC instruction. After the issuance of ALLOC, at state 206, the first seven registers of callee B's local area 214 have the same content as the content of the seven registers found in caller A's output area 210. After a return, at state 208, CFM 220 of procedure A is restored from PFS.pfm field 224 of procedure B. Also, register renaming is reset to the caller A's configuration, i.e. the local registers for procedure A are renamed to 32-45 and the output registers for procedure A are renamed to 46-52.

Figure 3:
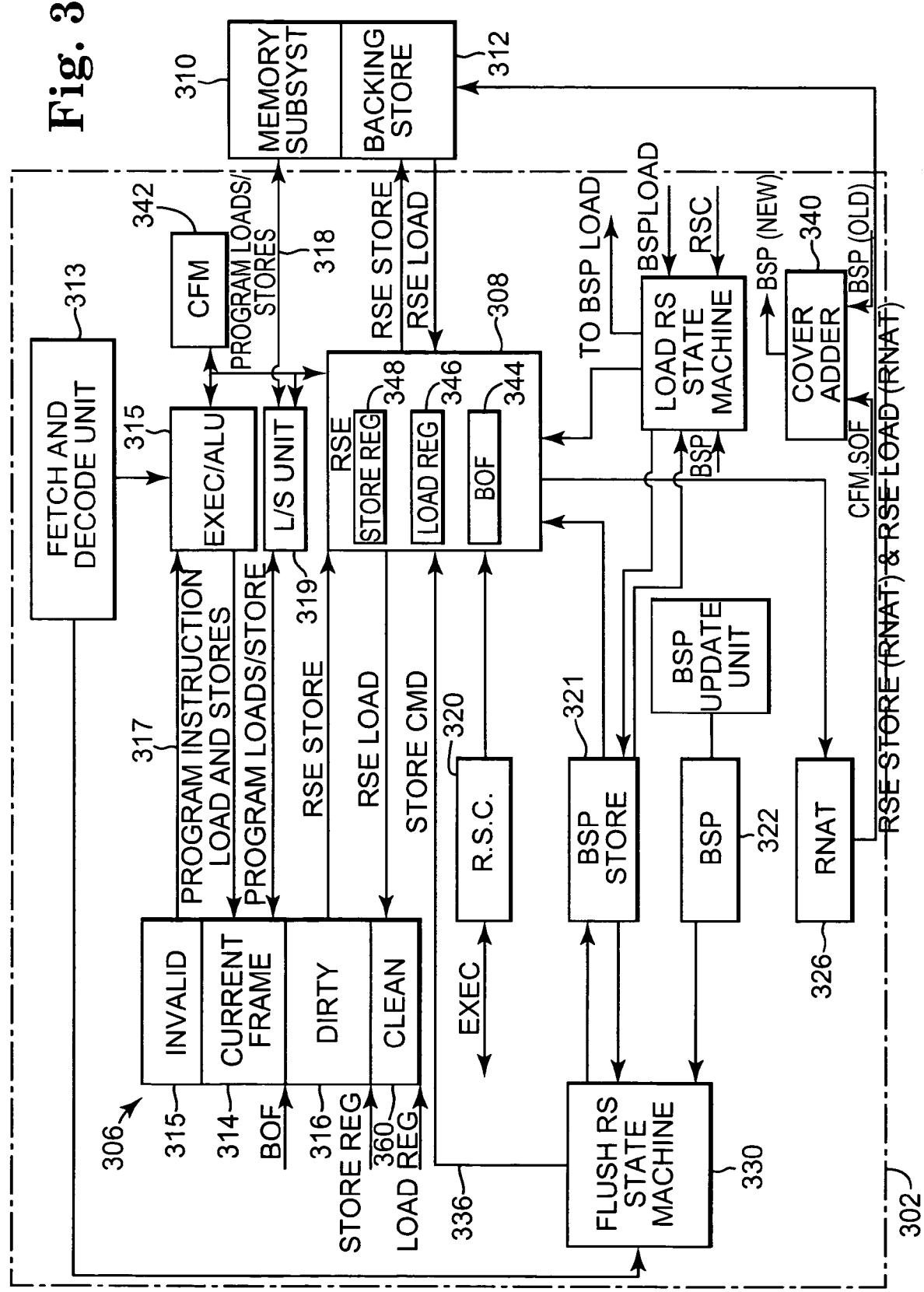
FIG. 3 is a block diagram of a microprocessor configured in accordance with one embodiment of the present invention.

FIG. 3 is a block diagram of a microprocessor 302 according to one embodiment of the present invention. Microprocessor 302 includes a register stack 306. As described above, the static subset (not shown) of the register stack 306 includes registers that are visible (available) to all procedures of a program executing on the processor 302 and includes a number of general registers. The stacked subset of the register stack 306 includes a portion allocated for a current frame 314, a portion constituting a dirty register subset 316 (hereinafter referred to as "dirty subset"), a portion constituting a clean register subset 360 (hereinafter referred to as "clean subset""), and a portion constituting an invalid register subset 315 (hereinafter referred to as "invalid subset"). Dirty subset 316 includes zero or more registers that contain values from parent procedure frames. The registers in the dirty subset 316 have not yet been spilled to a backing store portion 312 of a memory subsystem 310. The clean subset 360 includes zero or more registers that contain values from parent procedure frames. The registers in the clean subset have been successfully spilled to the backing store 312 and the contents of the registers have not been modified since they were written to the backing store 312. The invalid subset 315 includes zero or more registers that are not in the current frame 314 and that do not contain values from parent procedure frames. The registers in the invalid subset 315 are immediately available for allocation into the current frame or for register stack engine load operations.

A register stack engine (RSE) 308 is coupled to both backing store 312 and the register stack 306. The register stack engine 308 is capable of performing fill operations by loading values from the backing store 312 into the register stack 306 ("register stack engine loads"), and of performing spill operations by storing values from the register stack 306 in the backing store 312 (referred to as a "register stack engine stores"). The register stack engine 308 maintains a number of internal registers for capturing the current state of the register stack 306. For example, the register stack engine 308 maintains a bottom of frame (BOF) register 344 to store a pointer to the bottom the current frame 314. Because the register stack 306 is treated logically as a circular buffer, the BOF register 344 indicates the lowest logical register in the current frame 314, which may not be the register in the current frame 314 with the lowest physical register number. The register stack engine 308 also maintains a load register (LoadReg) 346 that stores the physical register number of the register at the bottom of the clean subset 360. The value of LoadReg 346 indicates the physical register number one greater than the next register to load, modulo the number of physical registers in the stacked subset of the register stack 306. The register stack engine 308 also maintains a store register (StoreReg) 348 that stores the physical register number of the register at the bottom of the dirty subset 316. The value of StoreReg 348 indicates the physical register number of the next register to be stored by the register stack engine 308.

Microprocessor 302 executes a programmed stream of instructions that initially are stored in memory subsystem 310. Instructions from memory subsystem 310 may be transferred to an instruction cache that may be included in a fetch and decode unit 313. The fetch and decode unit 313 receives an instruction pointer from an instruction pointer generator (not shown) based on which an instruction is fetched from the instruction cache to an EXECUTION/Arithmetic Logic Unit (ALU) 315. Execution/ALU unit 315 is coupled to register stack 306 via line 317. Some of the instructions fetched to the EXECUTION/ALU 315 may be instructions related to a caller or a callee procedure. Typically, upon a procedure call, the parameters of a calling procedure are stored in register stack 306. Upon occurrence of certain conditions, such as stack overflow, data stored in register stack 306 is saved to memory subsystem 310 to be preserved for further later usage. Data within stacked subset of the register stack 306, outside the current frame, is typically saved to backing store 312 of memory 310 by way of the Register Stack Engine (RSE) 308. Data included in current frame 314 may be stored to memory 310 or loaded from memory 310 by way of load/store unit 319, which performs program load and store operations with respect to procedure related information. The load/store unit 319 is controlled by the software which has "visibility" into the current frame.

Register stack engine 308 operates concurrently with program execution by performing spills from stacked subset of the register stack 306, outside the current frame, to backing store 312 and fills from backing store 312 to a portion 360 of the stacked subset allocated for clean registers. Clean registers are defined as registers that contain values from previous register frames that have been previously stored in memory. The operation of register stack engine 308 is controlled by a register stack configuration (RSC) application register 320 which is coupled to register stack engine 308. RSC 320 includes two mode bits that determine the mode of the register stack engine. Bit zero of the RSC mode enables eager register stack engine stores and bit one enables eager register stack engine loads. When register stack engine 308 operates in an "eager" mode, register stack engine 308 performs register spills and fills independent of instruction execution. The eager mode is defined as a mode where register stack engine performs spill or fill operations in a speculative fashion. Register stack engine 308, when acting speculatively, saves and restores registers ahead of time (i.e., before the software "tells" the register stack engine 308 to perform saving or restoring of registers). In the eager mode, the register stack engine 308 can perform load and store operations without stalling the processor. When both mode bits are zero (enforced lazy mode), register stack engine 308 issues mandatory loads and stores (i.e., register stack engine. 308 spills and fills registers only when it is required to do so by the software). Contrasted to the eager mode, in the lazy mode, the register stack engine acts (spills and fills registers) only if an overflow or underflow occurs. Register stack engine 308 may be controlled at all privilege levels by way of several instructions and by accessing four application registers: RSC 320, BSP 322, BSPSTORE 321 and RNAT 326. Other elements shown in FIG. 3 (i.e., FLUSHRS State Machine 330, LOADRS State Machine, and Cover Adder 340) are described in detail in the commonly owned U.S. patent application Ser. No. 09/199,003, entitled "Method and Apparatus for Transferring Data Between a Register Stack and a Memory Resource," referenced above.

According to one aspect of the present invention, a method and apparatus are provided for managing access to registers that are outside the current register stack frame (defined by CFM 342). A fault is generated upon an attempt to write to a register that is outside the current stack frame. Reads from registers that are outside the current stack frame are allowed, but the results of such read operations are undefined. It is possible for an application program executing within the architecture described above to attempt to read from and write to registers that are outside the program's current stack frame because the current stack frame varies in size and the register IDs used by application programs to access registers are capable of specifying registers with register IDs that are greater than the size of the current stack frame. For example, as described above, a register ID may be a 7-bit value and therefore be capable of specifying any number between 0 and 127, inclusive. The current stack frame of a particular application program, however, typically has far fewer than 128 registers. Despite the fact that the size of the current stack frame is smaller than the total number of registers addressable by a 7-bit register ID, the application program may attempt to access a register using a 7-bit register ID that falls outside the current stack frame.

For example, if the current stack frame of an application program contains eight registers (with register IDs numbered from 32 through 39, inclusive), the program may attempt to access (i.e., read or write) a register using a register ID that is outside the current stack frame, such as a register having a register ID of 50. Although it is possible for the application program to generate such a register ID and to use the register ID in a program instruction, use of such a register ID to access a register is improper because it constitutes an attempt to access a register that is currently outside the control of the application program. If the techniques of the present invention are not applied, an attempt to write to such a register may interfere with the operation of the register stack engine 308 or with the operation of a calling procedure. Similarly, if the techniques of the invention are not applied, an attempt to read from such a register may cause a fault and result in an inoperable problem which had previously operated correctly on other computer architectures.

To resolve these problems, according to one aspect of the present invention, a fault is generated upon an attempt to write to a register that is outside the current stack frame. This prevents the currently executing application from interfering with the operation of the register stack engine 308. According to a further aspect of the present invention, reads from registers that are outside the current stack frame are allowed, but the results of such read operations are undefined. It is beneficial to allow such reads to execute without causing a fault to be generated when software speculation techniques for enhancing program execution performance are used. As described above, speculative execution refers to execution of certain program instructions, such as reading from registers, before such program instructions are required by a program, in order to take advantage of processor idle time. For example, application of speculative execution techniques to a program might result in reading from a register that is not in the current stack frame. Generating a fault upon attempting to perform such a speculative read would prevent the realization of the performance enhancements provided by speculative execution techniques. By allowing out-of-frame reads to occur without resulting in generation of a fault, the present invention allows programs to take advantage of performance enhancements provided by speculative execution techniques.

Figure 4:
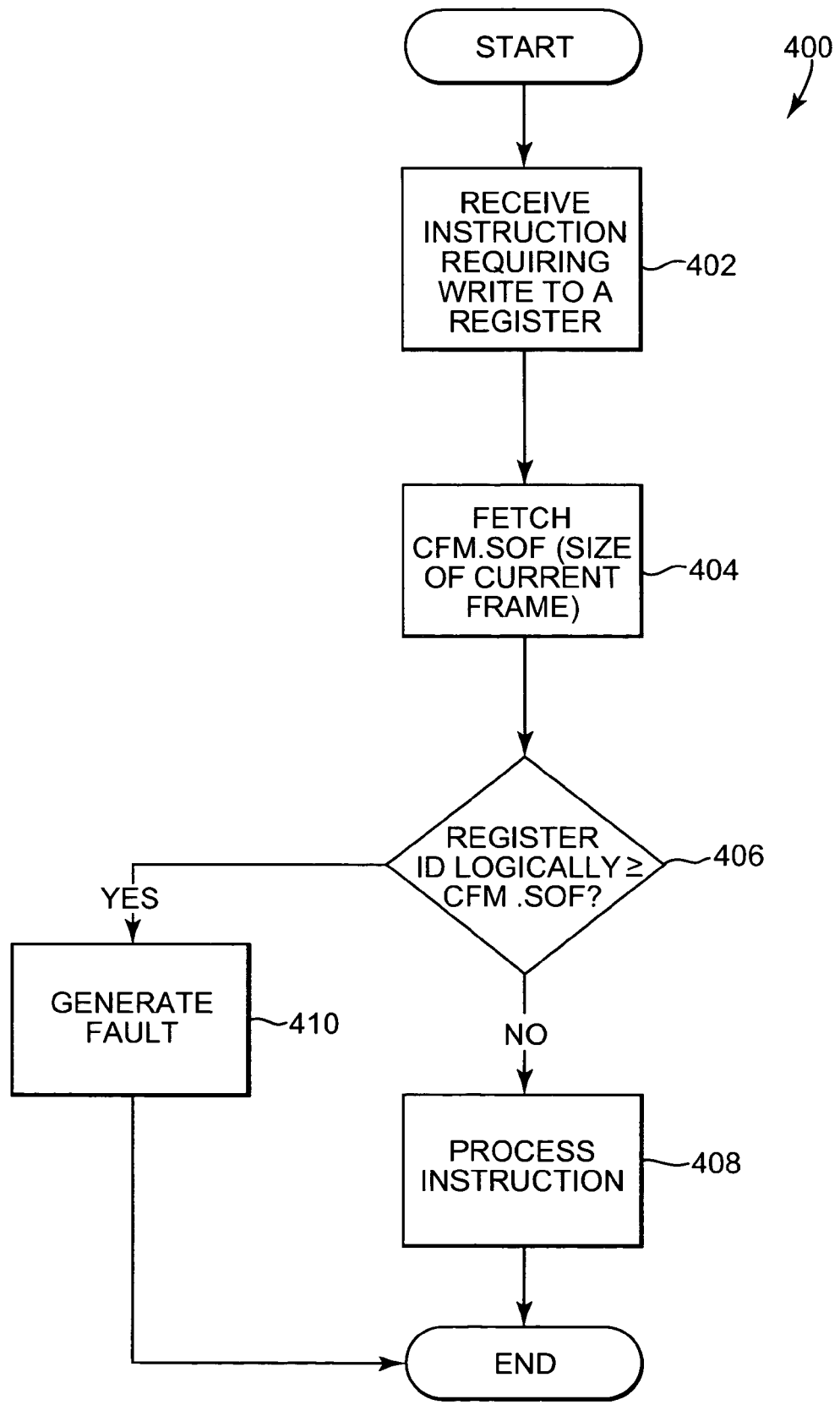
FIG. 4 is a flowchart of a process according to one embodiment of the present invention for preventing writes to registers that are outside the current stack frame.

Referring to FIG. 4, an example of a process 400 for managing writes to out-of-frame registers is shown. The process 400 may be executed by any instruction execution unit that executes instructions stored in the memory subsystem 310. Such instruction execution units include, for example, the execution/ALU 315 and the load/store unit 319. As described above,the fetch and decode unit 313 fetches program instructions from an instruction cache, execution/ALU 315 performs register-to-register operations, and load/store unit 319 performs register-to-memory operations. Each of the execution/ALU 315 and the load/store unit 319 receive the current frame marker 342 as an input, thereby providing the execution/ALU 315 and the load/store unit 319 with access to information such as the size of the current frame (stored in CFM.SOF). The process 400 starts at step 402 when an instruction whose execution requires writing to a register is encountered (e.g., by either the execution/ALU 315 or the load/store unit 319) in a stream of instructions that are executed by the processor 302. The instruction may be any of a variety of instructions whose execution requires writing to a register. The instruction may, for example, be an ADD instruction that specifies a target register in which to store the result of the addition operation performed by the ADD instruction. The size of the current frame (stored in the size of frame (SOF) field in the current frame marker 342) is fetched (step 404). The register ID of the register referenced by the instruction received in step 402 is compared to the size of the current frame (step 406). If the register ID is not greater than or equal to the size of the current frame, the register ID references a register that is within the current stack frame and the instruction is executed (e.g., by the execution/ALU 515 or the load/store unit 519) in its typical fashion (step 408). For example, if the size of the current stack frame (SOF) is eight, then only registers having register ID's that are less than or equal to seven (8–1) are within the current stack frame. It should be appreciated that other methods for determining whether a referenced register is within the current stack frame may be used, and that step 406 is shown merely as an example of a way in which it may be determined whether a referenced register is within the current stack frame.

If the register ID of the register referenced in the instruction received in step 402 is greater than or equal to the size of the current stack frame (step 406), then the referenced register is outside the current stack frame, and a fault is generated (step 410). For example, an illegal operation fault may be generated. Generation of a fault prevents data from being written to the referenced register and halts execution of the currently executing program. Typically, generation of a fault results in termination of the currently executing program and generation of an appropriate error message for display to the user. Generation of such a fault therefore both prevents an incorrect program (i.e., a program which attempts to write to out-of-frame registers) from interfering with the proper execution of other procedures executing on the processor 302 and alerts the programmer to the error in the program. The generation of a fault in this situation may therefore be used as an aid in debugging the incorrect program.

Figure 5:
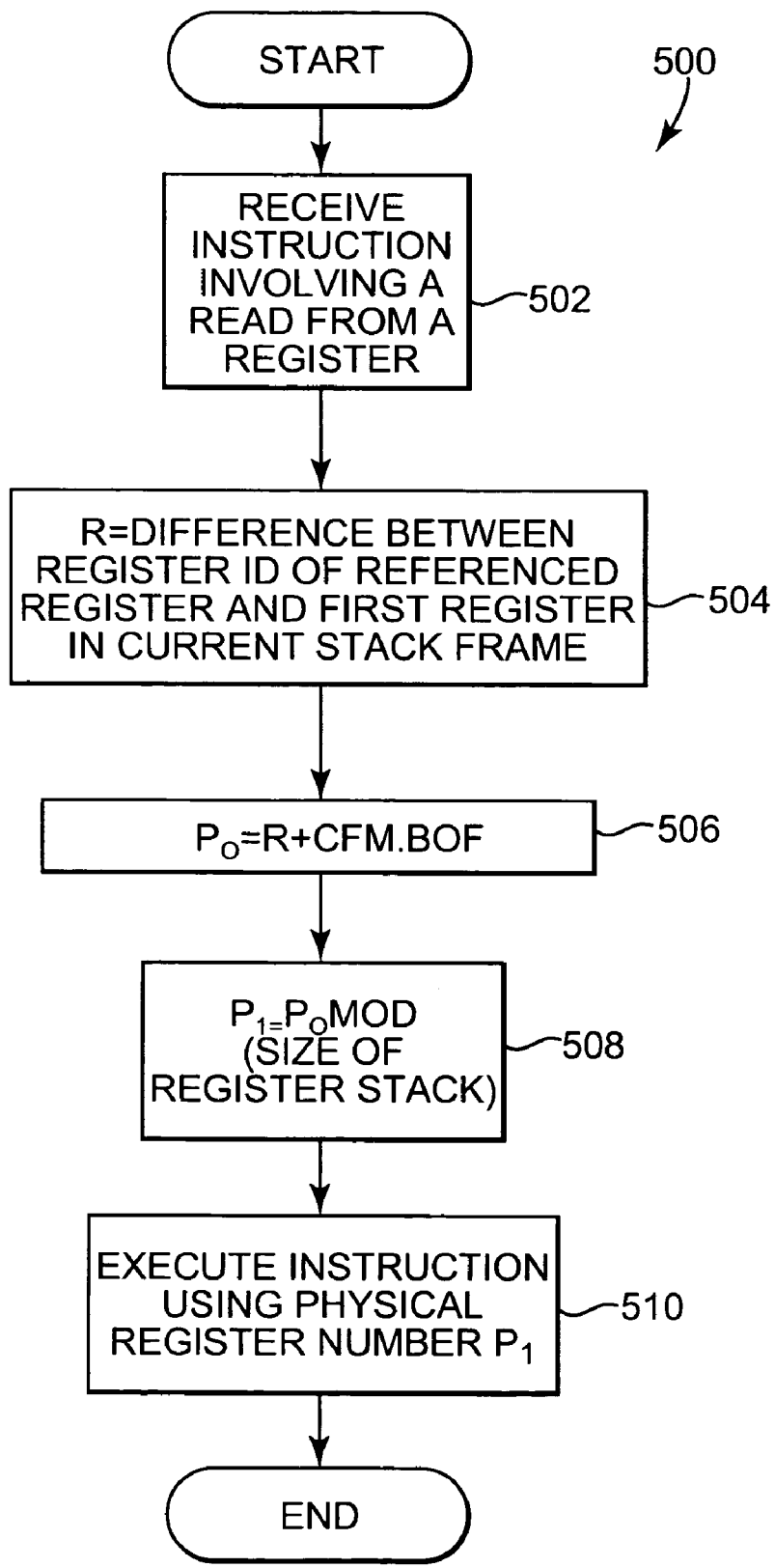
FIG. 5 is a flowchart of a process according to one embodiment of the present invention for managing reads from registers that are outside the current stack frame.

According to one embodiment of the present invention, when an instruction involving a read from a register is received by, for example, the execution/ALU 315 or the load/store unit 319, the instruction is executed without determining whether the register is within the current stack frame. As a result, the instruction is allowed to read from registers that are outside the current stack frame. The values read from such out-of-frame registers, however, are undefined. Referring to FIG. 5, an example of a process 500 for managing reads from out-of-frame registers is shown. An instruction involving a read from a register is received, e.g., by the execution/ALU 315 or the load/store unit 319 (step 502). The difference between the logical register ID of the register referenced by the instruction and the logical register ID of the first register in the current stack frame is determined and stored in a variable R (step 504). For example, as described above, the first general register in a stack frame that is accessible to software may be have a logical register number of 32 (GR32). In such a case, the value of R may be obtained by subtracting 32 from the logical register ID referenced for reading by the instruction received in step 502. Similarly, if registers in a stack frame that are accessible to software have logical register numbers beginning with zero, the value of R may simply be assigned the logical register ID referenced for reading in the instruction received in step 502.

The physical register number of the register that is at the bottom of the current stack frame (BOF 344) is added to R and the result is stored in a variable P0 (step 506). The value stored in P0 represents a first estimate of the physical register referenced by the instruction received in step 502. A physical register number of the register referenced in the instruction is obtained by performing modulus division of P0 by the size of the register stack 306, and storing the result (i.e., the remainder of the division of P0 by the size of the register stack 306) in a variable P1 (step 508). The instruction received in step 502 is then performed using the physical register number P1 (step 510). If the register ID referenced in the instruction received in step 502 refers to a register that is within the current stack frame, then the value of P1 is the physical register number of the register referenced in the instruction. If the register ID referenced in the instruction received in step 502 refers to a register outside the current stack frame, then the value of P1 refers to the physical register number of a register in the register stack 306, but the value of P1 may not refer to the register that the programmer intended. As a result, the value stored in the register referenced by P1 is undefined. Modulus division is used in step 508 to obtain a value for P1 that refers to a register within the register stack 306 so that the instruction may be executed in step 510. Use of modulus division, however, is provided merely as an example and is not limiting. Any process may be used to obtain a physical register number from which to read in the case that an instruction references a register that is outside the current stack frame.

It should be appreciated that the process 500 illustrated in FIG. 5 allows programs to read both from registers that are within the current stack frame and from registers that are outside the current stack frame without generating a fault. As described above, allowing out-of-frame reads to occur without generating a fault both allows existing applications to continue operating and does not interfere with use of software speculation techniques for enhanced program performance.

According to a further embodiment of the present invention, a fault (such as an illegal operation fault) is generated upon an attempt to write to a register that is outside the current stack frame. Because a program instruction that attempts to read from an out-of-frame register constitutes a programming error, generating a fault in such a situation may, for example, be useful to alert the programmer to the error. A fault may be generated in the case of an out-of-frame write by, for example, comparing the register ID of the register to the size of the current frame and generating a fault if the register ID is greater than or equal to the size of the current frame, as described above with respect to steps 406 and 410 (FIG. 4). This method of generating a fault is provided merely for purposes of example, however, and is not limiting. Furthermore, according to other embodiments of the present invention, other techniques may be used to interrupt program execution or bring the programming error to the attention of the programmer other than generation of a fault.

As described above, register stack engine 308 operates concurrently with program execution by performing (1) spills from the stacked subset of the register stack 306, outside of the current frame 314, to backing store 312, and (2) fills from backing store 312 to the clean subset 360 of the register stack 306. As described above, the current frame 314 is allocated to the procedure currently executing on the processor 302. In another aspect of the present invention, the register stack engine 308 is prevented from accessing registers within the current frame 314. Allowing the register stack engine 308 to access (load or store) registers in the current frame 314 would interfere with the operation of the currently executing procedure. Preventing such access by the register stack engine 308 to the current frame therefore ensures the integrity of the current frame 314 and ensures that its size and contents correspond to the size and contents expected by the current procedure executing on the processor 302. Preventing such access by the register stack engine 308 to the current frame also simplifies resource contention logic in the processor 302; by guaranteeing that there will not be two simultaneous attempts to write to a register within the current stack frame, the processor 302 need not include logic to handle such simultaneous write attempts. In one embodiment of the present invention, the register stack engine 308 is prevented from loading data from the backing store 312 into the current frame 314. In another embodiment of the present invention, the register stack engine 308 is prevented from storing data from the current frame 314 into the backing store 312.

Figure 6A:
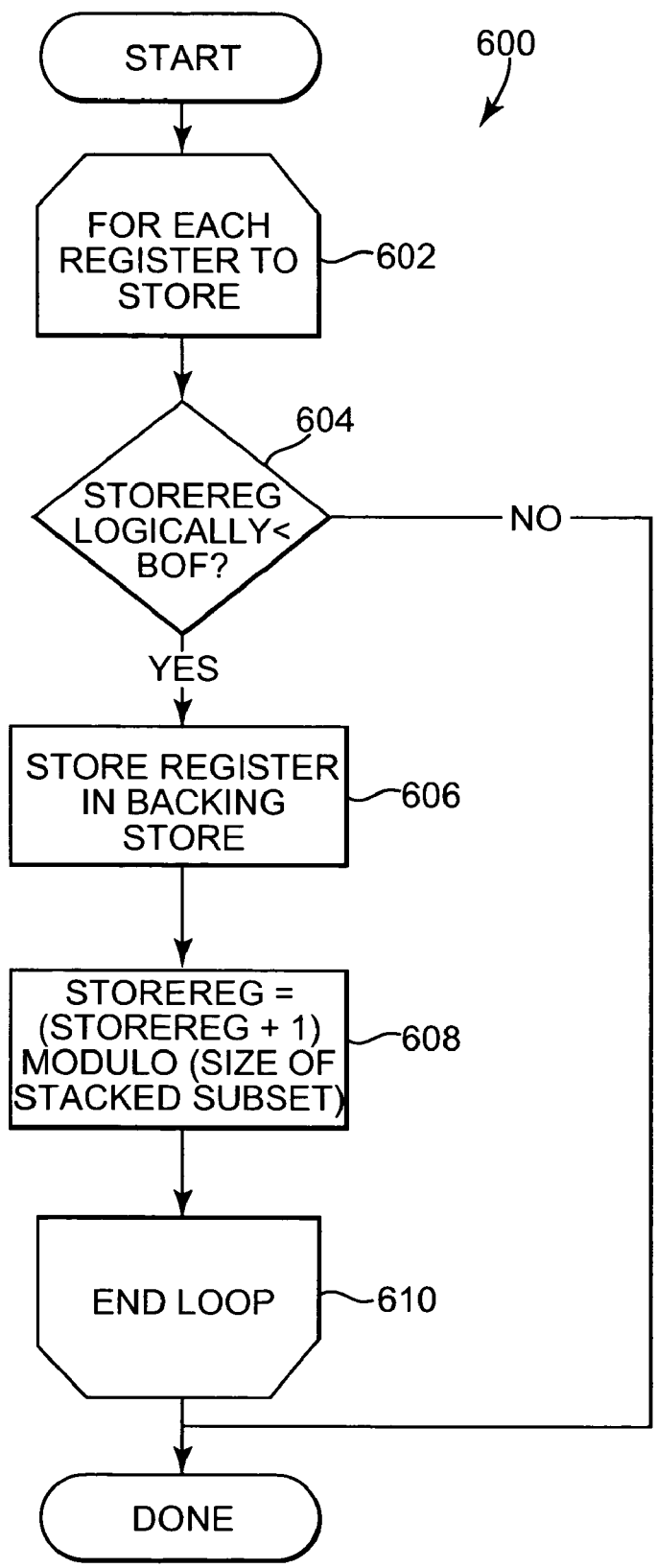
FIG. 6A is a flowchart of a process according to one embodiment of the present invention for preventing a register stack engine from spilling values of registers in a current register stack frame to a backing store.

Referring to FIG. 6A, in one embodiment of the present invention the register stack engine 308 is prevented from spilling values of registers in the current frame current frame 314 to the backing store 312 as follows. Consider an example in which the register stack engine 308 initiates an eager spill operation to spill a number of registers to the backing store 312. As described above, the register stack engine 308 spills registers from the dirty subset 316 to the backing store, beginning with the register indicated by StoreReg 348. The clean subset 360 grows upward as registers from the dirty subset 316 are spilled to the backing store 312. In one embodiment of the present invention, the register stack engine 308 executes a process 600 to spill registers from the dirty subset 316 to the backing store 312. The register stack engine 308 enters into a loop over each register to store (step 602). The register stack engine 308 determines whether the value of StoreReg 348 is logically less than the value of BOF 344 (step 604). As described above, the register stack 316 is maintained as a circular buffer, in which each physical register is assigned a logical register number. As a result, a first register with a physical register number greater than a physical register number of a second register may have a logical register number that is less than the logical register number of the second register. As used herein, "logically less than" and "logically greater than" refers to comparisons of logical register numbers according to the circular buffer scheme described above.

If the value stored in StoreReg 348 is logically less than the value stored in BOF 344, then the register pointed to by StoreReg 348 is not within the current frame 314, and the register stack engine 308 spills (i.e., stores) the register pointed to by StoreReg 348 to the backing store 312 at the location indicated by the value of BSPStore 321 (step 606). The register stack engine 308 increments the value of StoreReg 348, modulo the number of registers in the stacked subset of the register stack 306 (step 608). Steps 604-608 are repeated for each register to store (step 610). If, at any point, the value of StoreReg 348 is not logically less than the value of BOF 344 (step 604), the register pointed to by StoreReg 348 is within the current frame 314, and the register stack engine 308 does not spill the register pointed to by StoreReg 348 to the backing store 312. As a result, the register stack engine 308 is prevented from spilling registers in the current frame 314 to the backing store 312.

Figure 6B:
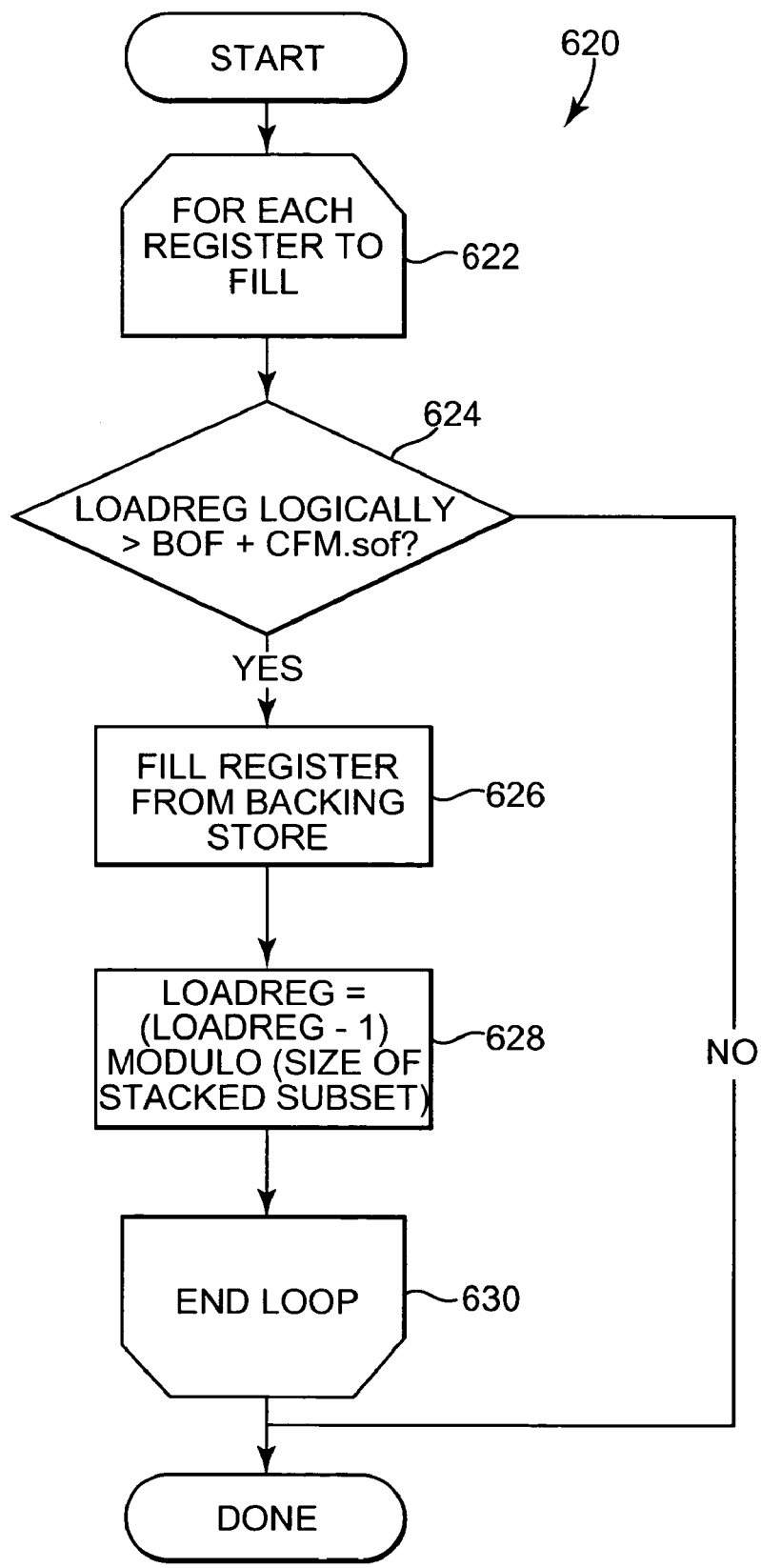
FIG. 6B is a flowchart of a process according to one embodiment of the present invention for preventing a register stack engine from filling registers in a current register frame with values from a backing store.

Referring to FIG. 6B, in a further embodiment of the present invention, the register stack engine 308 is prevented from filling registers in the current frame current frame 314 with values from the backing store 312 as follows. Consider an example in which the register stack engine 308 initiates an eager fill operation to fill a number of registers in the register stack 306 from the backing store 312. As described above, the register stack engine 308 fills registers from the backing store 312 into the stacked subset of the register stack 306, beginning with the register indicated by LoadReg 348. The clean subset 360 grows downward as it is filled with values from the backing store 312. In one embodiment of the present invention, the register stack engine 308 executes a process 620 to fill registers in the register stack 306 with values from the backing store 312. The register stack engine 308 enters into a loop over each register to fill (step 622). The register stack engine 308 determines whether the value of LoadReg 346 is logically greater than the value of BOF 344 plus CFM.SOF (the size of the current frame 314) (step 624). If the value stored in LoadReg 346 is logically greater than the value stored in BOF 344 plus CFM.SOF, then the register pointed to by LoadReg 346 is not within the current frame 314, and the register stack engine 308 fills (i.e., loads) the register pointed to by LoadReg 346 with the value stored in the backing store 312 at the location indicated by BSP (step 626). The register stack engine 308 decrements the value of LoadReg 346, modulo the number of registers in the stacked subset of the register stack 306 (step 628). Steps 624-628 are repeated for each register to fill (step 630). If, at any point, the value of LoadReg 346 is not less than the value of BOF 344 plus CFM.SOF (step 624), the register pointed to by LoadReg 348 is within the current frame 314, and the register stack engine 308 does not fill the register pointed to by LoadReg 346 from the backing store 312. As a result, the register stack engine 308 is prevented from filling registers in the current frame 314 with values from the backing store 312.

Having now described a few embodiments, it should be apparent to those skilled in the art that the foregoing is merely illustrative and not limiting, having been presented by way of example only. Numerous modifications and other embodiments are within the skill of one of ordinary skill in the art and are contemplated as falling within the scope of the invention.

What is claimed is:

1. In a processor including a register stack, the register stack including a plurality of register stack frames, each of the register stack frames including zero or more registers, one of the plurality of register stack frames comprising a current register stack frame, a method comprising steps of:
   (A) identifying a register to be spilled to a backing store;
   (B) determining whether the identified register is in the current register stack frame; and
   (C) spilling the register to the backing store in response to determining that the identified register is not in the current register stack frame.

2. The method of claim 1, wherein the processor further includes a description of a set of registers within the current register stack frame, and wherein the step (B) comprises a step of:
   (B)(1) determining whether the identified register is in the current register stack frame based on the description.

3. In a processor including a register stack, the register stack including a plurality of register stack frames, each of the register stack frames including zero or more registers, one of the plurality of register stack frames comprising a current register stack frame, a method comprising steps of:
   (A) identifying a register to be filled from a backing store;
   (B) determining whether the identified register is in the current register stack frame; and
   (C) filling the register from the backing store in response to determining that the identified register is not in the current register stack frame.

4. The method of claim 3, wherein the processor further includes a description of a set of registers within the current register stack frame, and wherein the step (B) comprises steps of:
   (B)(1) determining whether the identified register is in the current register stack frame based on the description.

5. In a processor including a register stack, the register stack including a plurality of register stack frames, each of the register stack frames including zero or more registers, one of the plurality of register stack frames comprising a current register stack frame, an apparatus comprising:
   means for identifying a register to be spilled to a backing store;
   means for determining whether the identified register is in the current register stack frame; and
   means for spilling the register to the backing store in response to determining that the identified register is not in the current register stack frame.

6. The apparatus of claim 5, wherein the processor further includes a description of a set of registers within the current register stack frame, and wherein the means for determining comprises:
   means for determining whether the identified register is in the current register stack frame based on the description.

7. In a processor including a register stack, the register stack including a plurality of register stack frames, each of the register stack frames including zero or more registers, one of the plurality of register stack frames comprising a current register stack frame, an apparatus comprising:
   means for identifying a register to be filled from a backing store;
   means for determining whether the identified register is in the current register stack frame; and
   means for filling the register from the backing store in response to determining that the identified register is not in the current register stack frame.

8. The apparatus of claim 7, wherein the processor further includes a description of a set of registers within the current register stack frame, and wherein the means for determining comprises:
   means for determining whether the identified register is in the current register stack frame based on the description.

9. A processor comprising:
   a register stack including a plurality of register stack frames, each of the register stack frames including zero or more registers, one of the plurality of register stack frames comprising a current register stack frame; and
   a register stack engine to identify a register to be spilled to a backing store, to determine whether the identified register is in the current register stack frame, and to spill the register to the backing store in response to determining that the identified register is not in the current register stack frame.

10. The processor of claim 9, further including a description of a set of registers in the current register stack frame, and wherein the register stack engine determines whether the identified register is in the current register stack frame based on the description.

11. A processor comprising:
   a register stack including a plurality of register stack frames, each of the register stack frames including zero or more registers, one of the plurality of register stack frames comprising a current register stack frame; and
   a register stack engine to identify a register to be filled from a backing store, to determine whether the identified register is in the current register stack frame, and to fill the register from the backing store in response to determining that the identified register is not in the current register stack frame.

12. The processor of claim 11, further including a description of a set of registers within the current register stack frame, and wherein the register stack engine determines whether the identified register is in the current register stack frame based on the description.

13. The method of claim 1, wherein the step (B) comprises a step of:
   (B)(1) comparing a logical register number of the identified register to a reference value.

14. The method of claim 3, wherein the step (B) comprises a step of:
   (B)(1) comparing a logical register number of the identified register to a reference value.

15. The method of claim 5, wherein the means for determining comprises:
   means for comparing a logical register number of the identified register to a reference value.

16. The method of claim 7, wherein the means for determining comprises:
   means for comparing a logical register number of the identified register to a reference value.

17. The processor of claim 9, wherein the register stack engine determines whether the identified register is in the current register stack frame by comparing a logical register number of the identified register to a reference value.

18. The processor of claim 9, wherein the register stack engine comprises a bottom of frame register to store a pointer to the bottom of the current register stack frame.

19. The processor of claim 11, wherein the register stack engine determines whether the identified register is in the current register stack frame by comparing a logical register number of the identified register to a reference value.

20. The processor of claim 11, wherein the register stack engine comprises a bottom of frame register to store a pointer to the bottom of the current register stack frame.

21. A computer system comprising:

a register stack including a plurality of register stack frames, each of the register stack frames including zero or more registers, one of the plurality of register stack frames comprising a current register stack frame; and a register stack engine to identify a register to be spilled to a backing store, to determine whether the identified register is in the current register stack frame, and to spill the register to the backing store in response to determining that the identified register is not in the current register stack frame.

22. A computer system comprising:

a register stack including a plurality of register stack frames, each of the register stack frames including zero or more registers, one of the plurality of register stack frames comprising a current register stack frame; and a register stack engine to identify a register to be filled from a backing store, to determine whether the identified register is in the current register stack frame, and to fill the register from the backing store in response to determining that the identified register is not in the current register stack frame.

* * * * *

UNITED STATES PATENT AND TRADEMARK OFFICE
CERTIFICATE OF CORRECTION

PATENT NO. : 7,334,112 B2
APPLICATION NO. : 10/702355
DATED : February 19, 2008
INVENTOR(S) : Achmed Rumi Zahir et al.

It is certified that error appears in the above-identified patent and that said Letters Patent is hereby corrected as shown below:

In column 2, line 40, delete "a further" and insert -- one --, therefor.

In column 2, lines 50-59, after "frame." delete "The processor may further include an identifier of a next register in the register stack to spill to the backing store, and the step (B) may include steps of: (B)(1) determining that the identified register is in the current register stack frame when the next register in the register stack to spill to the backing store is in the current stack frame; and (B)(2) determining that the identified register is not in the current register stack frame when the next register in the register stack to spill to the backing store is not in the current stack frame.".

In column 14, line 48, delete "BSP" and insert -- BSPLoad --, therefor.

Signed and Sealed this

Seventeenth Day of June, 2008

JON W. DUDAS
*Director of the United States Patent and Trademark Office*